(No Model.) 2 Sheets—Sheet 2.
J. VAN WORDRAGEN.
HARVESTER WHEEL.
No. 443,126. Patented Dec. 23, 1890.
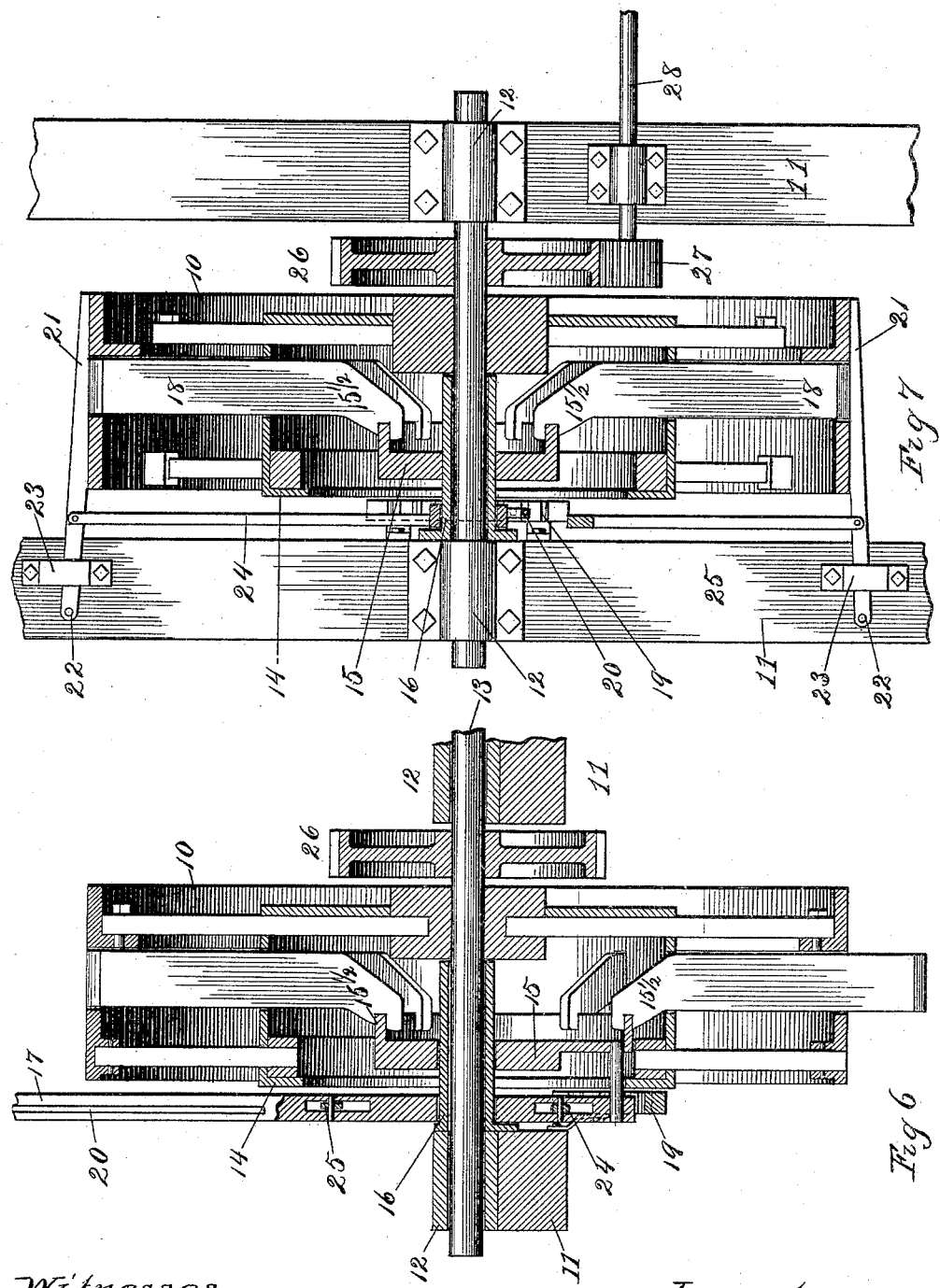
Witnesses
W. C. Corliss
W. J. Watts
Inventor
John Van Wordragen
By E. C. Crawford,
Atty

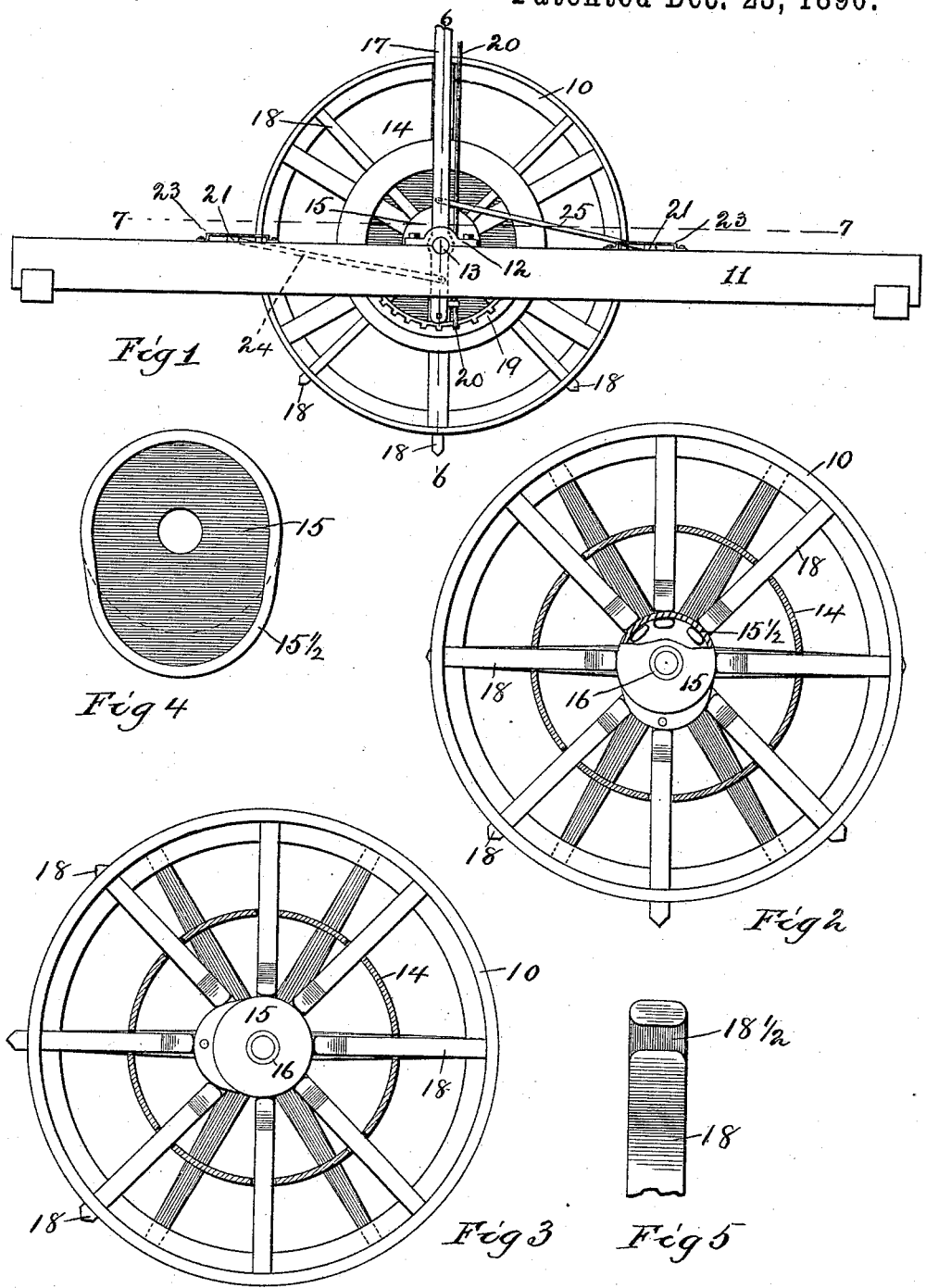

UNITED STATES PATENT OFFICE.

JOHN VAN WORDRAGEN, OF CROWLEY, LOUISIANA.

HARVESTER-WHEEL.

SPECIFICATION forming part of Letters Patent No. 443,126, dated December 23, 1890.

Application filed August 28, 1890. Serial No. 363,361. (No model)

*To all whom it may concern:*

Be it known that I, JOHN VAN WORDRAGEN, a citizen of the United States, residing in Crowley, in the parish of Acadia, in the State of Louisiana, have invented certain new and useful Improvements in Rice-Harvesters, of which the following is a specification.

My invention relates to mechanism to be applied to the main wheel of rice-harvesting machines, traction-engines, or other traction-machines; and its object is to prevent such wheel from slipping on the ground while the machinery is being operated. The efficiency of all such machinery depends on whether there is sufficient friction between such main wheel and the ground to cause the wheel to revolve instead of slipping. On the revolution of this depends the action of the rest of the machinery, since the other parts of the machinery are connected directly or indirectly with this wheel.

While my invention may be applied to any traction-machine, I have elected to show it as applied to a rice-harvesting machine. Its construction and use for such purpose are therefore fully illustrated in the accompanying drawings, in which—

Figure 1 is a side elevation of the main wheel and a part of the frame of a rice-harvester embodying my invention. Fig. 2 is a side elevation of the main wheel detached, showing some of the traction-pins pushed beyond the tire of the wheel downward, also the eccentric designed to actuate such pins. Fig. 3 is a like view of said wheel, showing the eccentric with its major axis in horizontal position. Fig. 4 is a rear elevation of the eccentric. Fig. 5 is an elevation of the inner portion of a traction-pin. Fig. 6 is a vertical cross-section of the main wheel, taken on the line 6 6 of Fig. 1. Fig. 7 is a plan section of the same, taken on the line 7 7 of Fig. 1.

Like numerals refer to like parts throughout the several views.

In the drawings, 10 is the main wheel of the machine; 11, a bar composing a part of the frame-work of the machinery; 12, a journal-box bolted on the top of the same, and 13 the end of the axle of the wheel. The wheel and its axle are rigid with each other, and the axle revolves in the said journal-box.

It is obvious that the journal-box and axle support the frame-work of the machine.

14 is a circular casing secured to the wheel at its central part. It contains the eccentric 15, which is sleeved on the axle 13 by the sleeve 16. The lever 17 is rigidly secured on the sleeve 16, and is designed to be used to change the position of the eccentric.

18 represents the traction-pins. Each of these is made with a recess 18½ in one side near its inner end. In such recesses the rim 15½ of the eccentric rests. This rim is made transverse to the edge of the eccentric. The outer ends of the traction-pins are made sharp, so that they will enter the ground. The rim of the casing 14 is of course slotted for the passage of the traction-pins.

19 is a ratchet-rack secured to the bar 11, and 20 is a spring-pawl secured along the side of the lever 17, being designed to engage with the teeth of the rack 19.

21 21 are scrapers designed to keep the upper part of the wheel free from mud. They are pivoted on the pins 22, secured in the bar 11, and pass beneath the clamps 23, bolted to said bar. These clamps are made long and high enough to permit some lateral movement of the scrapers. The rods 24 and 25 are pivoted to the scrapers and to the lever 17. The cog-wheel 26 is rigidly secured on the axle 13 of the main wheel, and engages with the pinion 27 on the shaft 28, the latter being the medium of transmission of the motion of the main wheel to the machinery of the harvester.

The lever 17 and eccentric 15 must be secured on the sleeve 16, so that the former will be parallel with the major axis of the latter and the greater section of the eccentric will be below the sleeve when the lever is vertical. The rods 24 and 25 are made of such length that when the lever 17 is vertical the scrapers are brought against the tire of the main wheel, the rods being pivoted to the lever, respectively, above and below the sleeve.

It is obvious that when the above-named parts are in above-described position the invention is ready for use in soft ground. For starting the harvester the casing 14 revolves with the main wheel 10, the traction-pins 18, carried around with the casing, are forced downward as they enter the lowest quadrant of the circle of their revolution by the action of the rim of the eccentric in their recesses, and at the lowest part of such quadrant they are driven into the ground. Thus they keep the main wheel from slipping, and so it continues to revolve and accomplish its work of driving the harvester machinery. Now, turning the lever 17 half-way around, the eccentric will be in position to force the traction-pins out sidewise, and the scrapers will be thrown away from the rim of the main wheel. Thus the harvester may be drawn over hard ground without hinderance from the traction-pins.

Having fully described my invention, what I claim as new therein, and desire to secure by Letters Patent of the United States, is—

1. In a rice-harvester, substantially as described, the combination of its main wheel, the sleeve 16 on the axle of the same, the eccentric 15, having a rim transverse to its edge secured to the said sleeve, the casing 14 for the eccentric, having several slots through its rim, the traction-pins 18, formed to engage with said rims, placed in said casing so that they may pass through such slots, and the lever 17, secured to the sleeve 16 and designed to actuate the eccentric, as and for the purpose specified.

2. In a traction-machine, substantially as described, the combination of the eccentric 15, the casing 14, the ratchet-rack 19, secured to the bar 11, the sleeve 16, the lever 17, and the spring-pawl 20, secured along the side of said lever and designed to engage with said rack, as and for the purpose specified.

3. In a rice-harvester, substantially as described, the combination of the main wheel 10, the sleeve 16 on the axle of the main wheel, the lever 17, secured on said sleeve, the scrapers 21, pivoted on the bar 11 of the framework of the harvester, and the rods 24 and 25, pivoted each to one of the scrapers and both to lever 17, respectively, above and below said sleeve, as and for the purposes specified.

JNO. VAN WORDRAGEN.

Witnesses:
D. B. HAYES,
W. O. DAILEY.